(12) United States Patent
Akita

(10) Patent No.: US 10,144,166 B2
(45) Date of Patent: Dec. 4, 2018

(54) SHEET MANUFACTURING APPARATUS AND SHEET MANUFACTURING METHOD

(71) Applicants: MITSUBISHI GAS CHEMICAL COMPANY, INC., Tokyo (JP); MGC FILSHEET CO., LTD., Saitama (JP)

(72) Inventor: Reiki Akita, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 15/112,256

(22) PCT Filed: Jan. 14, 2015

(86) PCT No.: PCT/JP2015/050776
§ 371 (c)(1),
(2) Date: Jul. 18, 2016

(87) PCT Pub. No.: WO2015/133170
PCT Pub. Date: Sep. 11, 2015

(65) Prior Publication Data
US 2016/0339620 A1    Nov. 24, 2016

(30) Foreign Application Priority Data

Mar. 7, 2014    (JP) .................... 2014-044832

(51) Int. Cl.
*B29C 47/00*    (2006.01)
*B29C 59/04*    (2006.01)
(Continued)

(52) U.S. Cl.
CPC .......... *B29C 47/0061* (2013.01); *B29C 35/02* (2013.01); *B29C 43/222* (2013.01);
(Continued)

(58) Field of Classification Search
CPC ... B29C 47/884; B29C 47/888; B29C 47/886; B29C 66/81835; B29C 66/81885;
(Continued)

(56) References Cited

U.S. PATENT DOCUMENTS

2010/0086793 A1* 4/2010 Kawashita ............... C25D 5/06
428/458

FOREIGN PATENT DOCUMENTS

JP    8-110723    4/1996
JP    9-34295    2/1997
(Continued)

OTHER PUBLICATIONS

JP5111800B2—Machine Translation.*
(Continued)

*Primary Examiner* — Matthew J Daniels
*Assistant Examiner* — Yunju Kim
(74) *Attorney, Agent, or Firm* — Greenblum & Bernstein, P.L.C.

(57) ABSTRACT

This sheet manufacturing apparatus is provided with: a nozzle for extruding a heated resin sheet; a main roll with a surface on which microstructures are formed; a follower roll disposed at a distance from the main roll; and an electricity-supplying mechanism. The electricity-supplying mechanism heats an electrically conductive section of the main roll by supplying electricity to the electrically conductive section from both edges of the main roll.

16 Claims, 3 Drawing Sheets

(51) Int. Cl.
   *B29C 47/88* (2006.01)
   *B29C 43/22* (2006.01)
   *B29C 35/02* (2006.01)
   *B29C 43/46* (2006.01)
   *B29C 43/02* (2006.01)
   *B29C 59/02* (2006.01)
   *B29L 31/34* (2006.01)

(52) U.S. Cl.
   CPC ...... *B29C 47/0021* (2013.01); *B29C 47/8805* (2013.01); *B29C 59/04* (2013.01); *B29C 59/046* (2013.01); *B29C 35/0277* (2013.01); *B29C 47/887* (2013.01); *B29C 2035/0211* (2013.01); *B29C 2043/025* (2013.01); *B29C 2043/461* (2013.01); *B29C 2059/023* (2013.01); *B29K 2995/0005* (2013.01); *B29L 2031/3475* (2013.01)

(58) Field of Classification Search
   CPC ... B29C 47/0061; B29C 35/02; B29C 43/222; B29C 47/0021; B29C 47/8805; B29C 59/04; B29C 59/046; B29C 2043/025; B29C 2043/461; B29C 2059/023; B29C 35/0277; B29C 47/887; B29C 43/24; B29C 43/245; B29C 43/52; B29C 2043/522; B29C 2043/525; B29C 2043/568; B29C 43/46; B29C 2043/465; B29C 33/026; B29C 33/085; B29C 39/38; B29C 47/88; B29C 47/8885; B29C 59/02; B29C 59/043; B29C 59/10; B29C 59/103; B29C 59/106; G03G 15/20; B29K 2995/0005; B29L 2031/3475
   USPC .......................................... 264/404; 428/458
   See application file for complete search history.

(56) References Cited

FOREIGN PATENT DOCUMENTS

| | | |
|---|---|---|
| JP | 9-212023 | 8/1997 |
| JP | 2003-243129 | 8/2003 |
| JP | 2011-191648 | 9/2011 |
| JP | 2012-25016 | 2/2012 |
| JP | 5111800 | 10/2012 |
| WO | 2006/001997 A1 | 1/2006 |

OTHER PUBLICATIONS

JPH09212023A—Machine Translation.*
JPH0934295A—Machine Translation.*
JP2011191648A—Machine Translation.*
JP2003243129A—Machine Translation (Year: 2003).*
International Search Report issued in Japanese Patent Application No. PCT/JP2015/050776, dated Mar. 31, 2015.
Extended European Search Report issued in counterpart European Patent Application No. 15758518.3, dated Sep. 20, 2017.

* cited by examiner

SHEET MANUFACTURING APPARATUS AND SHEET MANUFACTURING METHOD

TECHNICAL FIELD

The present invention relates to a sheet manufacturing apparatus and method for manufacturing a sheet including microstructures in a surface thereof, and more specifically relates to a sheet manufacturing apparatus and method for manufacturing a prism sheet to be used for a back-lighting device in a liquid-crystal display apparatus.

BACKGROUND ART

A back-lighting device in a general liquid-crystal display apparatus mainly includes a light source, a light-guiding plate (light-guiding film) that guides light from the light source; a reflective sheet that reflects light passing through the light-guiding plate, a diffusion sheet for homogenizing light emitted from a light-emission surface of the light-guiding plate, and a prism sheet that enhances a luminance of the light in a perpendicular direction of the light-emission surface.

A method for manufacturing such prism sheet will be described. A conventional manufacturing apparatus 10, which is illustrated in FIG. 5, includes a die 1 that receives and extrudes a heated resin, a rectangular extrusion outlet 2 formed in the die 1, a main roll 3, and a follower roll 4. The main roll 3 and the follower roll 4 are disposed below the extrusion outlet 2 so as to sandwich a resin sheet 11 to be shaped therebetween, the resin sheet 11 being extruded from the extrusion outlet 2. In a surface of the main roll 3, microstructures for transferring prism shapes to the resin sheet 11 are formed.

The manufacturing apparatus 10 lets the heated resin sheet 11 through between the main roll 3 and the follower roll 4 and thereby shapes the resin sheet 11 into a prism sheet 12. In the shaping, as a result of the main roll 3 and the resin sheet being brought into contact with each other, a temperature of a surface of the resin sheet 11 decreases in area A of the main roll 3 illustrated in FIG. 5, and the resin sheet 11 thus becomes hard, which causes the problem of failure to accurately transfer the microstructures in the roll 3 to the resin sheet 11.

Therefore, in order to solve such problem, apparatuses including a mechanism that heats a vicinity of area A of the main roll 3 have been proposed. For example, Japanese Patent No. 5111800 describes a sheet molding apparatus in which a heating unit including a plurality of heat-transfer heaters is embedded in an outermost layer of a main roll 11 and the heat-transfer heaters are independently controlled, thereby preventing decrease in temperature of a resin sheet, as illustrated in FIG. 5 of Japanese Patent No. 5111800. Furthermore, Japanese Patent No. 5111800 also describes a sheet molding apparatus in which a radiation heating device such as a laser or a halogen lamp is provided outside a main roll to heat an outermost layer of the main roll 11, as illustrated in FIG. 6 of Japanese Patent No. 5111800.

CITATION LIST

Patent Literature

Patent Literature 1
  Japanese Patent No. 5111800

SUMMARY OF INVENTION

Technical Problem

However, in the sheet molding apparatus in Japanese Patent No. 5111800, the heating unit is embedded in the outermost layer of the main roll 11, which results in the problem of complication of a structure of the outermost layer of the main roll, and with repeated heating of the outermost layer, the outermost layer deteriorates and is more likely to be broken. Also, the radiation heating device described in Japanese Patent No. 5111800 is unable to directly heat an area of the outermost layer of the main roll, the area being in contact with a resin sheet. Thus, the heating efficiency is poor and it is difficult to set proper heating conditions.

Therefore, an object of the present invention is to provide a sheet manufacturing apparatus and method that enable a resin sheet to be heated to a proper temperature via a main roll, without complicating a structure of an outermost layer of the main roll.

Solution to Problem

In order to solve the aforementioned problems, the present invention is intended to supply power to a conductor in an outermost layer of a main roll to make the conductor generate heat. In other words, aspects of the present invention are as follows. Aspect 1 provides a sheet manufacturing apparatus including a nozzle for extruding a heated resin sheet, a main roll including a surface portion with a microstructure formed therein, and a follower roll disposed at a distance from the main roll, the sheet being pressed between the main roll and the follower roll to transfer the microstructure to the sheet, the apparatus including: a conductive portion in the surface portion; and a power supply mechanism that supplies power to the conductive portion from opposite ends of the main roll in order to make the conductive portion generate heat.

Aspect 2 provides the sheet manufacturing apparatus according to aspect 1, wherein the power supply mechanism includes a pair of terminal portions that are in contact with the conductive portion at the opposite ends of the main roll, respectively, and a power source that supplies power to the conductive portion via the pair of terminal portions. Aspect 3 provides the sheet manufacturing apparatus according to aspect 2, wherein the terminal portions each include a looped conductive belt that is in contact with the conductive portion, a roll-side pulley that presses the conductive belt against the conductive portion, and a tension pulley that maintains tension of the conductive belt. Aspect 4 provides the sheet manufacturing apparatus according to aspect 3, wherein the conductive belt is a stainless steel belt. Aspect 5 provides the sheet manufacturing apparatus according to aspect 2, wherein the terminal portions include a pair of conductive brushes or conductive pulleys that are in contact with the conductive portion at the opposite ends of the main roll, respectively, and a power source that supplies power to the conductive portion via the pair of conductive brushes or conductive pulleys.

Aspect 6 provides the sheet manufacturing apparatus according to any one of aspects 1 to 5, wherein the conductive portion is a conductive sleeve. Aspect 7 provides the sheet manufacturing apparatus according to any one of aspects 1 to 5, wherein the conductive portion is a plating layer. Aspect 8 provides the sheet manufacturing apparatus according to any one of aspects 1 to 7, wherein a part of the conductive portion, the part being parallel to a rotation axis direction of the main roll, is made to generate heat using the power supply mechanism. Aspect 9 provides the sheet manufacturing apparatus according to any one of aspects 1 to 8, wherein the conductive portion of the main roll is made to generate heat on a side on which the sheet is guided between the main roll and the follower roll.

Aspect 10 provides a sheet manufacturing method for shaping a resin sheet using a main roll including a surface portion with a microstructure formed therein, and a follower roll disposed at a distance from the main roll, the method including the steps of: extruding the heated sheet from a nozzle; supplying power to a conductive portion of the surface portion from opposite ends of the main roll via a power supply mechanism; making the conductive portion generate heat using the power supplied by the power supply mechanism; and pressing the resin sheet between the main roll and the follower roll in a state in which the conductive portion generates heat, thereby transferring the microstructure to the resin sheet.

Aspect 11 provides the sheet manufacturing method according to claim 10, wherein the power supply mechanism includes a pair of terminal portions that are in contact with the conductive portion at the opposite ends of the main roll, respectively, and a power source that supplies power to the conductive portion via the pair of terminal portions. Aspect 12 provides the sheet manufacturing method according to aspect 11, wherein the terminal portions each include a looped conductive belt that is in contact with the conductive portion, a roll-side pulley that presses the conductive belt against the conductive portion, and a tension pulley that maintains tension of the conductive belt. Aspect 13 provides the sheet manufacturing method according to aspect 12, wherein the conductive belt is a stainless steel belt. Aspect 14 provides the sheet manufacturing apparatus according to aspect 11, wherein the terminal portions include a pair of conductive brushes or conductive pulleys that are in contact with the conductive portion at the opposite ends of the main roll, respectively, and a power source that supplies power to the conductive portion via the pair of conductive brushes or conductive pulleys.

Aspect 15 provides the sheet manufacturing method according to any one of aspects 10 to 14, wherein the conductive portion is a conductive sleeve. Aspect 16 provides the sheet manufacturing method according to any one of claims 10 to 14, wherein the conductive portion is a plating layer. Aspect 17 provides the sheet manufacturing method according to any one of aspects 10 to 16, wherein the step of making the conductive portion generate heat includes making a part of the conductive portion, the part being parallel to a rotational axis direction of the main roll, generate heat. Aspect 18 provides the sheet manufacturing method according to any one of aspects 10 to 17, wherein the step of making the conductive portion generate heat includes making the conductive portion of the main roll generate heat on a side on which the sheet is guided between the main roll and the follower roll.

Advantageous Effects of Invention

The present invention enables a surface part of a main roll to be maintained at a proper temperature in order to transfer microstructures in the main roll to a sheet, without complicating an outermost layer structure of the main roll and thus enables efficient manufacturing of a sheet including microstructures.

DESCRIPTION OF EMBODIMENTS

Figure 1:
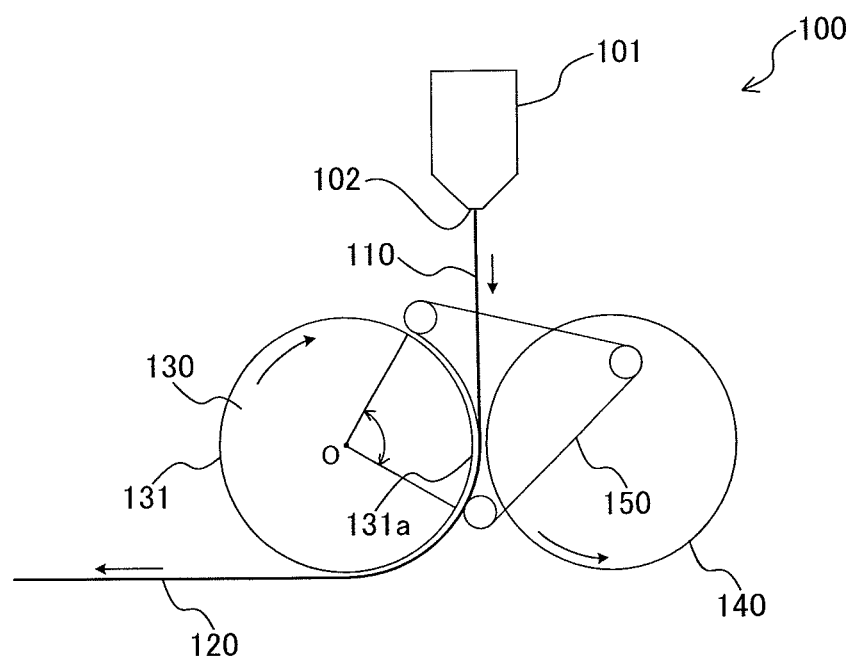
FIG. 1 is a schematic configuration diagram of a sheet manufacturing apparatus according to a first embodiment of the present invention.

Embodiments of a sheet manufacturing apparatus and a sheet manufacturing method according to the present invention will be described with reference to the drawings. In the drawings of the embodiments, parts that are identical to each other are provided with a same reference numeral and description thereof will not be repeated.

(First Embodiment)

A sheet manufacturing apparatus according to a first embodiment will be described with reference to FIGS. 1 and 2. As illustrated in FIG. 1, a sheet manufacturing apparatus 100 includes a die 101 that receives and extrudes a heated resin such as polycarbonate, a rectangular extrusion outlet 102 formed in the die 101, a main roll 130 with microstructures, such as prisms, for transfer in a surface thereof, a follower roll 140, and a power supply mechanism 150 that supplies power to the main roll 130. The main roll 130 and the follower roll 140 are disposed below the extrusion outlet 102 so as to sandwich a resin sheet 110 to be shaped therebetween, the resin sheet 110 being extruded from the extrusion outlet 102. In an entire circumference of a surface portion 131 of the main roll 130, microstructures for transferring prism shapes to the resin sheet 110 and a later-described conductive portion 131a formed by, e.g., plating or a sleeve are formed.

Figure 2:
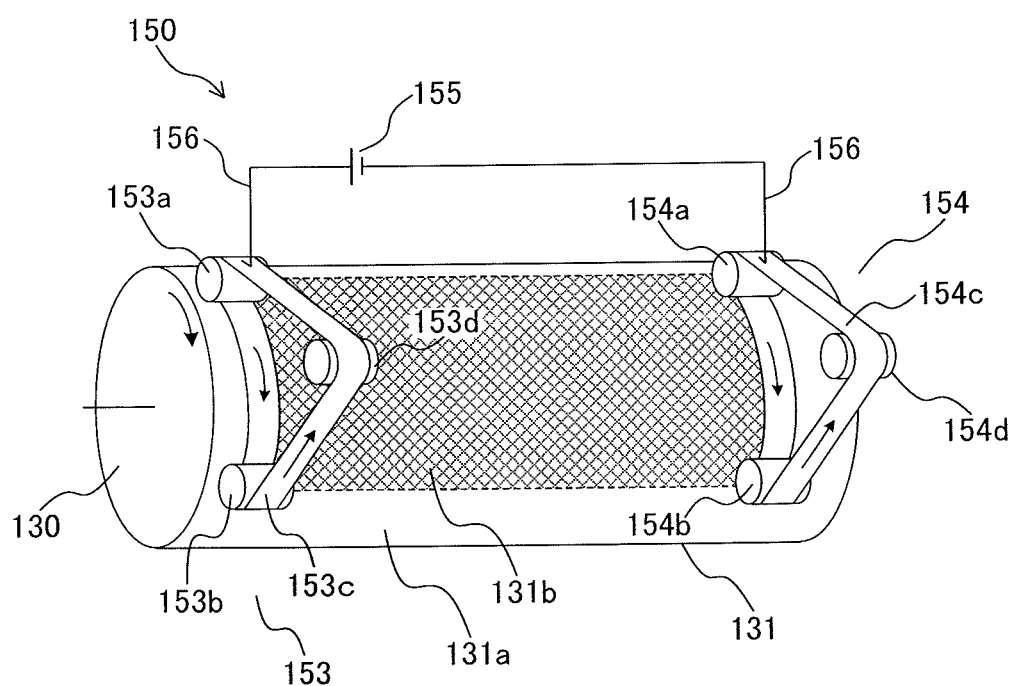
FIG. 2 is a perspective diagram illustrating a main roll and a power supply mechanism in the sheet manufacturing apparatus in FIG. 1.

As illustrated in FIG. 2, the power supply mechanism 150 includes a first terminal portion 153 that is in contact with the conductive portion 131a on the left end side of the main roll 130, a second terminal portion 154 that is in contact with the conductive portion 131a on the right end side of the main roll 130, and a power source 155 electrically connected to the first terminal portion 153 and the second terminal portion 154 via wirings 156. The first terminal portion 153 includes a conductive belt 153c that is in contact with the conductive portion 131a that is exposed to a curved surface on the left end side of the main roll 130, roll-side pulleys 153a and 153b that press the conductive belt 153c against the conductive portion 131a, and a tension pulley 153d provided at a position distant from the main roll 130. Proper tension of the conductive belt 153c is maintained by the tension pulley 153d, whereby an outer surface of a part of the conductive belt 153c between the roll-side pulleys 153a and 153b is brought into surface contact with the conductive portion 131a on the left end side of the main roll 130.

The second terminal portion 154 includes a conductive belt 154c that is in contact with the conductive portion 131a that is exposed to the curved surface on the right end side of the main roll 130, roll-side pulleys 154a and 154b that press the conductive belt 154c against the conductive portion 131a, and a tension pulley 154d provided at a position distant from the main roll 130. Proper tension of the conductive belt 154c is maintained by the tension pulley 154d, whereby a surface of a part of the conductive belt 154c positioned between the roll-side pulleys 154a and 154b is brought into surface contact with the conductive portion 131a on the left end side of the main roll 130. Upon power supply from the first terminal portion 153 and the second terminal portion 154 to the conductive portion 131a, a heat generation area 131b positioned between the first terminal portion 153 and the second terminal portion 154 generates heat. Here, in order to electrically interconnect the conductive belts 153c and 154c, which rotate, and the respective wirings 156, conductive brushes can be provided at respective terminal portion-side ends of the wirings 156. Although the follower roll 140 is not illustrated in FIG. 2, the follower roll 140 has a length in a rotation axis direction that is smaller than that of the main roll 130 so as not to become an obstacle to the first terminal portion 153 and the second terminal portion 154.

The pulleys are rotatably held by, e.g., non-illustrated holding members such as frames. The conductive belt 153c is preferably formed from stainless steel (SUS), but may be formed from another conductive material such as conductive rubber. The power source 155 can provide power of, for example, around 10 V and 200 A.

TABLE 1

|  | Conventional main roll (° C.) | Main roll in embodiment (° C.) |
|---|---|---|
| Temperature of heat medium | 130 | 110-120 |
| Temperature of heat generation area | — | 150-160 |

In the first embodiment, a temperature of a resin sheet can be increased to a temperature that is favorable for transfer of the microstructures, by heat generated by the heat generation area 131b itself, and thus, even if a roll rotation speed and a resin sheet feeding speed are increased, the microstructures can properly be transferred to the resin sheet, which provides an enhanced transfer efficiency.

(Second Embodiment)

Figure 3:
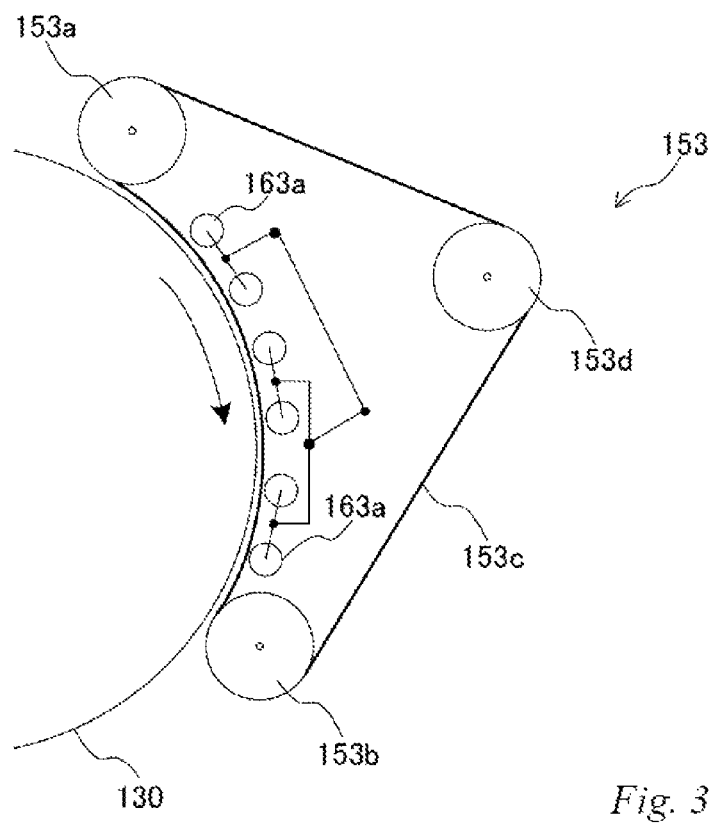
FIG. 3 is an enlarged view of a major part of a power supply mechanism according to a second embodiment of the present invention.

A sheet manufacturing apparatus and method according to a second embodiment will be described with reference to FIG. 3. The sheet manufacturing apparatus according to the second embodiment has a structure that is basically similar to that of the sheet manufacturing apparatus 100 illustrated in FIGS. 1 and 2. Therefore, only parts that are different from that of the sheet manufacturing apparatus 100 will be described. As shown in FIG. 3, the sheet manufacturing apparatus according to the second embodiment has additional pulleys 163a that are in contact with the conductive belt 153c between the roll-side pulleys 154a and 154b.

(Third Embodiment)

A sheet manufacturing apparatus according to a third embodiment will be described with reference to FIG. 4. The sheet manufacturing apparatus according to the third embodiment has a structure that is basically similar to that of the sheet manufacturing apparatus 100 illustrated in FIGS. 1 and 2, but is different from that of the sheet manufacturing apparatus 100 in terms of structures of first and second terminal portions of a power supply mechanism.

Figure 4:
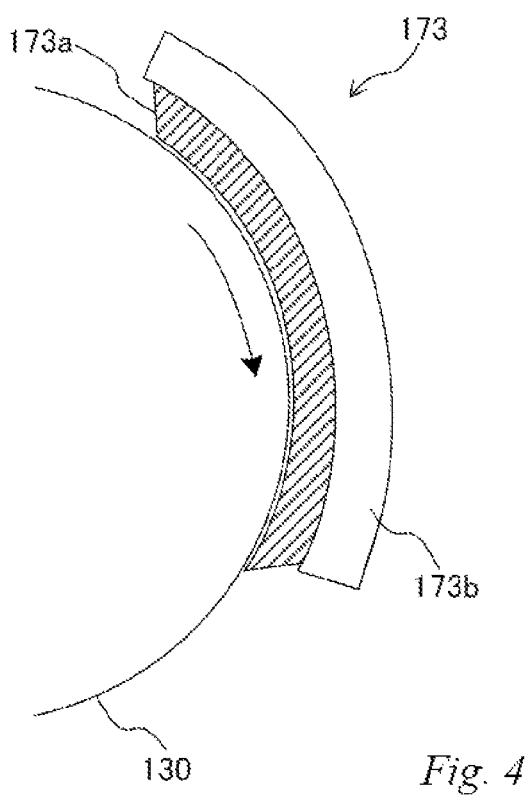
FIG. 4 is an enlarged view of a major part of a power supply mechanism according to a third embodiment of the present invention.
Figure 5:
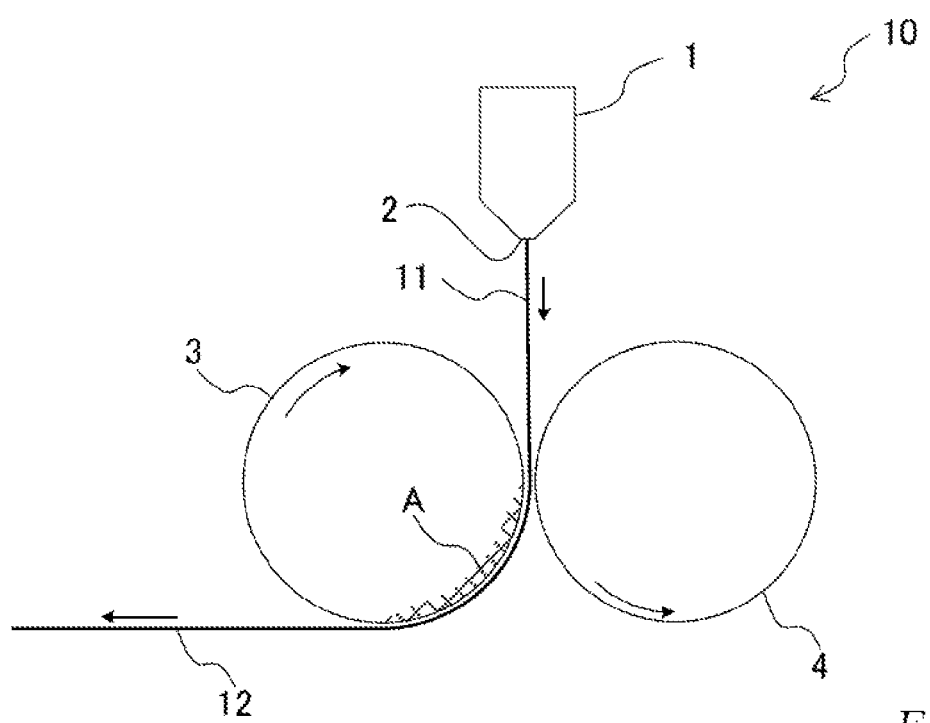
FIG. 5 is a schematic configuration diagram of a conventional sheet manufacturing apparatus.

FIG. 4 is an enlarged view of a major part as a main roll 130 is viewed in a rotation axis direction. As illustrated in FIG. 4, a first terminal portion 173 in the third embodiment includes a conductive brush 173a and a brush holder 173b that holds the conductive brush 173a. Although not illustrated, a second terminal portion in the third embodiment has a structure that is similar to that of the first terminal portion 173 and is provided on another end side of a main roll 130. The conductive brushes provided at the opposite ends of the main roll are connected to a non-illustrated power source. It is also possible that conductive brushes are provided at the opposite ends of the main roll 130 and electrode portions fixed at respective positions that allow the electrode portions to face the respective conductive brushes are provided. Each of the electrode portions has an arc-like curved surface that is in contact with the corresponding conductive brush, and is connected to the power source.

REFERENCE SIGNS LIST 100 sheet manufacturing apparatus
101 die
102 extrusion outlet
110 resin sheet
120 prism sheet
130 main roll
131 surface portion
131a conductive portion
131b heat generation area
140 follower roll
150 power supply mechanism
153 first terminal portion
153a roll-side pulley
153b roll-side pulley
153c conductive belt
154d tension pulley
154 second terminal portion
154a roll-side pulley
154b roll-side pulley
154c conductive belt
154d tension pulley
155 power source
163a additional pulley

The invention claimed is:

1. A sheet manufacturing apparatus comprising:
a nozzle for extruding a heated resin sheet,
a main roll comprising a surface portion with a microstructure formed therein,
a follower roll disposed at a distance from the main roll, the heated resin sheet being pressed between the main roll and the follower roll to transfer the microstructure to the sheet,
a conductive portion in the surface portion, and
a power supply mechanism that supplies power to the conductive portion from opposite ends of the main roll in order to make the conductive portion generate heat,
wherein the power supply mechanism includes a pair of terminal portions that are in contact with the conductive portion at the opposite ends of the main roll, respectively, and a power source that supplies power to the conductive portion via the pair of terminal portions,
wherein the follower roll has a length in a rotation axis direction that is smaller than that of the main roll so as not to become an obstacle to the pair of terminal portions, and
wherein the pair of terminal portions of the power supply mechanism continually contact the conductive portion along a curved surface of the main roll on a side of the main roll facing the follower roll, and a heat generation area of the main roll is positioned between the pair of terminal portions to generate heat on the side of the main roll facing the follower roll, and the pair of terminal portions are positioned so as to sandwich the follower roll between the pair of terminal portions.

2. The sheet manufacturing apparatus according to claim 1, wherein the terminal portions each include a looped conductive belt that is in contact with the conductive portion, a roll-side pulley that presses the conductive belt against the conductive portion, and a tension pulley that maintains tension of the conductive belt.

3. The sheet manufacturing apparatus according to claim 2, wherein the conductive belt is a stainless steel belt.

4. The sheet manufacturing apparatus according to claim 1, wherein the terminal portions include a pair of conductive brushes or conductive pulleys that are in contact with the conductive portion at the opposite ends of the main roll, respectively, and a power source that supplies power to the conductive portion via the pair of conductive brushes or conductive pulleys.

5. The sheet manufacturing apparatus according to claim 1, wherein the conductive portion is a conductive sleeve.

6. The sheet manufacturing apparatus according to claim 1, wherein the conductive portion is a plating layer.

7. The sheet manufacturing apparatus according to claim 1, wherein a part of the conductive portion, parallel to a rotation axis direction of the main roll, generates heat using the power supply mechanism.

8. The sheet manufacturing apparatus according to claim 1, wherein the conductive portion of the main roll generates heat on a side on which the sheet is guided between the main roll and the follower roll.

9. A sheet manufacturing method for shaping a resin sheet with a main roll comprising a surface portion with a microstructure fanned therein, and a follower roll disposed at a distance from the main roll, the method comprising:
extruding the heated sheet from a nozzle;
supplying power to a conductive portion of the surface portion from opposite ends of the main roll via a power supply mechanism;
making the conductive portion generate heat using the power supplied by the power supply mechanism; and
pressing the resin sheet between the main roll and the follower roll in a state in which the conductive portion generates heat, thereby transferring the microstructure to the heated resin sheet,
wherein the power supply mechanism includes a pair of terminal portions that are in contact with the conductive portion at the opposite ends of the main roll, respectively, and a power source that supplies power to the conductive portion via the pair of terminal portions,
wherein the follower roll has a length in a rotation axis direction that is smaller than that of the main roll so as not to become an obstacle to the pair of terminal portions, and
wherein the pair of terminal portions of the power supply mechanism continually contact the conductive portion along a curved surface of the main roll on a side of the main roll facing the follower roll, and a heat generation area of the main roll is positioned between the pair of terminal portions to generate heat on the side of the main roll facing the follower roll, and the pair of terminal portions are positioned so as to sandwich the follower roll between the pair of terminal portions.

10. The sheet manufacturing method according to claim 9, wherein the terminal portions each include a looped conductive belt that is in contact with the conductive portion, a roll-side pulley that presses the conductive belt against the conductive portion, and a tension pulley that maintains tension of the conductive belt.

11. The sheet manufacturing method according to claim 10, wherein the conductive belt is a stainless steel belt.

12. The sheet manufacturing method according to claim 9, wherein the terminal portions include a pair of conductive brushes or conductive pulleys that are in contact with the conductive portion at the opposite ends of the main roll, respectively, and a power source that supplies power to the conductive portion via the pair of conductive brushes or conductive pulleys.

13. The sheet manufacturing method according to claim 9, wherein the conductive portion is a conductive sleeve.

14. The sheet manufacturing method according to claim 9, wherein the conductive portion is a plating layer.

15. The sheet manufacturing method according to claim 9, wherein making the conductive portion generate heat includes making a part of the conductive portion, the part being parallel to a rotational axis direction of the main roll, generate heat.

16. The sheet manufacturing method according to claim 9, wherein making the conductive portion generate heat includes making the conductive portion of the main roll generate heat on a side on which the sheet is guided between the main roll and the follower roll.

* * * * *